United States Patent
Erickson et al.

(10) Patent No.: US 8,807,880 B2
(45) Date of Patent: Aug. 19, 2014

(54) TOOLHOLDER COUPLING FOR HIGH PRESSURE COOLANT

(75) Inventors: Robert Alfred Erickson, Raleigh, NC (US); William Michael Long, Latrobe, PA (US); Carla A. Erickson, legal representative, Raleigh, NC (US)

(73) Assignee: Kennametal Inc., Latrobe, PA (US)

( * ) Notice: Subject to any disclaimer, the term of this patent is extended or adjusted under 35 U.S.C. 154(b) by 1099 days.

(21) Appl. No.: 12/610,925

(22) Filed: Nov. 2, 2009

(65) Prior Publication Data

US 2011/0103902 A1 May 5, 2011

(51) Int. Cl.
*B23C 5/28* (2006.01)
*B23B 27/10* (2006.01)
*B23Q 11/10* (2006.01)
*B23B 31/107* (2006.01)
*B23B 31/00* (2006.01)

(52) U.S. Cl.
CPC .......... *B23B 31/006* (2013.01); *B23Q 11/1023* (2013.01); *B23B 2231/24* (2013.01); *B23Q 11/1015* (2013.01); *B23B 31/1071* (2013.01)
USPC ................................ 407/11; 408/57; 279/20

(58) Field of Classification Search
CPC ....................................................... B23B 27/10
USPC ....................... 407/11; 408/56, 57, 59, 239 R; 409/231–234; 82/160; 279/20
See application file for complete search history.

(56) References Cited

U.S. PATENT DOCUMENTS

| | | | |
|---|---|---|---|
| 2,552,463 A * | 5/1951 | Searles | 408/56 |
| 2,996,061 A * | 8/1961 | Miller | 408/59 |
| 3,609,931 A * | 10/1971 | Voorhies | 451/450 |
| 3,874,808 A * | 4/1975 | Zaccardelli et al. | 408/1 R |
| 4,213,354 A | 7/1980 | Dahinden | |
| 4,570,952 A * | 2/1986 | Heimbigner et al. | 279/20 |
| 4,588,334 A * | 5/1986 | Khurana | 408/61 |
| 4,636,118 A * | 1/1987 | Hunt | 409/136 |
| 4,648,759 A * | 3/1987 | Ebenhoch | 408/59 |
| 4,680,999 A | 7/1987 | Kojima et al. | |
| 4,723,877 A * | 2/1988 | Erickson | 409/234 |

(Continued)

FOREIGN PATENT DOCUMENTS

CH 700780 A1 10/2010
DE 2905484 C2 10/1985

(Continued)

OTHER PUBLICATIONS

Korean Intellectual Property Office, "Notification of Transmittal of the International Search Report and the Written Opinion of the International Searching Authority, or the Declaration", Jun. 24, 2011, 10 pp.

(Continued)

*Primary Examiner* — Andrea Wellington
*Assistant Examiner* — Sara Addisu
(74) *Attorney, Agent, or Firm* — Larry R. Meenan, Esq.

(57) ABSTRACT

A coolant coupling system for coupling a toolholder to a toolholder support member, wherein the shank of the toolholder is secured within the bore of the toolholder support member with an interference fit and a coolant channel extends through the toolholder support member to the toolholder passing through the region of the interference fit to provide a high pressure seal for the coolant passageway between the toolholder and the toolholder support member.

17 Claims, 6 Drawing Sheets

(56) References Cited

U.S. PATENT DOCUMENTS

| | | | |
|---|---|---|---|
| 4,747,735 A * | 5/1988 | Erickson et al. | 409/234 |
| 4,795,292 A * | 1/1989 | Dye | 409/136 |
| 4,841,817 A * | 6/1989 | Tsui et al. | 76/101.1 |
| 5,173,017 A * | 12/1992 | Oshnock et al. | 409/234 |
| 5,244,322 A * | 9/1993 | Schweizer et al. | 409/233 |
| 5,358,360 A * | 10/1994 | Mai | 408/61 |
| 5,402,696 A * | 4/1995 | Hecht et al. | 82/158 |
| 5,415,066 A * | 5/1995 | Erickson et al. | 82/160 |
| 5,694,820 A * | 12/1997 | Erickson et al. | 82/160 |
| 6,443,672 B1 | 9/2002 | Lagerberg | |
| 6,471,448 B1 | 10/2002 | Lagerberg | |
| 6,637,984 B2 | 10/2003 | Murakawa et al. | |
| 6,705,805 B2 | 3/2004 | Lagerberg | |
| 6,808,342 B2 * | 10/2004 | Kress et al. | 409/136 |
| 7,147,410 B2 * | 12/2006 | Jansen | 408/56 |
| 7,785,046 B2 * | 8/2010 | Beckington | 408/56 |
| 8,251,621 B2 * | 8/2012 | Kammermeier | 409/136 |
| 8,549,965 B2 * | 10/2013 | Erickson | 82/160 |
| 8,601,918 B2 * | 12/2013 | Erickson | 82/160 |
| 2002/0067965 A1 * | 6/2002 | Kress et al. | 408/59 |
| 2003/0002939 A1 * | 1/2003 | Tugend et al. | 408/181 |
| 2005/0169718 A1 * | 8/2005 | Beckington | 408/61 |
| 2010/0143051 A1 * | 6/2010 | Lutfi | 407/11 |
| 2012/0211950 A1 * | 8/2012 | Matheis | 279/20 |

FOREIGN PATENT DOCUMENTS

| | | |
|---|---|---|
| DE | 4031947 A1 | 4/1992 |
| DE | 3602247 C2 | 1/1997 |
| DE | 19736236 A1 | 7/1998 |
| DE | 19655334 B4 | 5/2006 |
| EP | 101917 A1 | 3/1984 |
| JP | 61-214939 A | 9/1986 |
| WO | 01-64376 A1 | 9/2001 |
| WO | 2008-066473 A1 | 6/2008 |
| WO | 2009010028 A1 | 1/2009 |

OTHER PUBLICATIONS

Jan. 15, 2014—K-2942USGB1—exam_report.

* cited by examiner

PRIOR ART

FIG. 1

PRIOR ART

TOOLHOLDER COUPLING FOR HIGH PRESSURE COOLANT

BACKGROUND OF THE INVENTION

1. Field of the Invention

The present invention relates to a coupling between a toolholder and a toolholder support member used for metal working operations. In particular, the invention is directed to a coolant coupling between these two parts suitable for high pressure applications.

2. Description of Related Art

Figure 1:
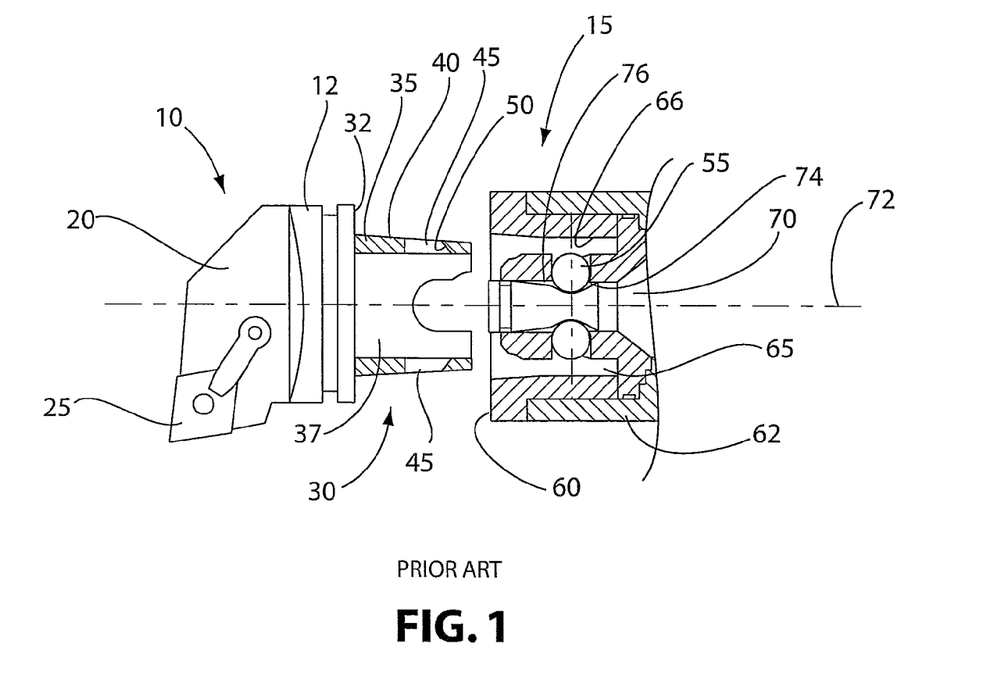
FIG. 1 is prior art and is a cross-sectional view of the disengaged position of a toolholder with respect to a toolholder support member.
Figure 2:
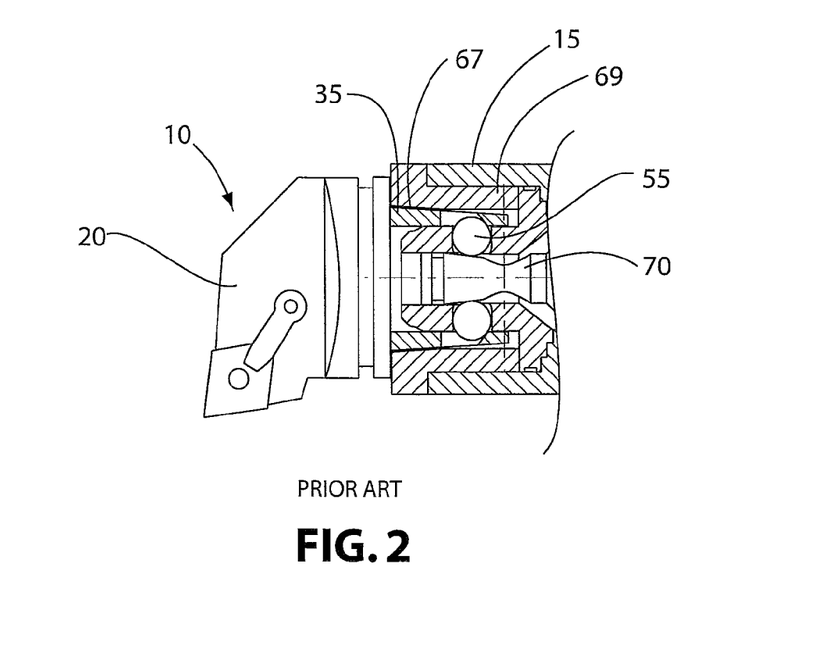
FIG. 2 is prior art and is a cross-sectional view of the arrangement illustrated in FIG. 1, however, in the engaged position.
Figure 3:
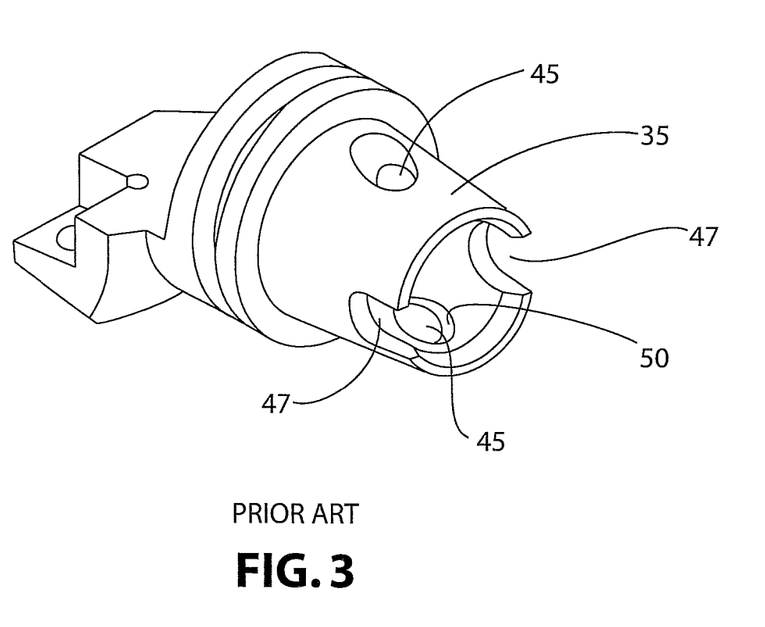
FIG. 3 is prior art and is a perspective view of a toolholder.

FIGS. 1-3 illustrate prior art and show a toolholder 10 for mounting within a clamping unit or toolholder support member 15. The toolholder 10 is made up of a body 12 having a front end 20 for holding a cutting tool such as a cutting insert 25. Although the toolholder 10 shown in FIGS. 1-3 is typical of a toolholder 10 used for non-rotating tooling, such as a lathe, it should be understood that the toolholder 10 may have attached to it any of a variety of tools that may be associated with either non-rotating or rotating applications.

The toolholder body 12 also has a back end 30 for supporting the body 12 within the toolholder support member 15. The back end 30 has a forwardly facing shoulder 32 and a tubular shank 35 which may be frusto-conical extending therefrom. The shank 35 is hollow, thereby defining a shank cavity 37 and the shank has a shank wall 40 with an exterior 42 and with radially extending perforations 45 having angled forwardly facing surfaces 50 adapted to be engaged by radially displaced balls 55 associated with the toolholder support member 15.

The toolholder support member 15 has a rearwardly facing surface 60 and a bore 65 extending forwardly therefrom.

Figure 4:
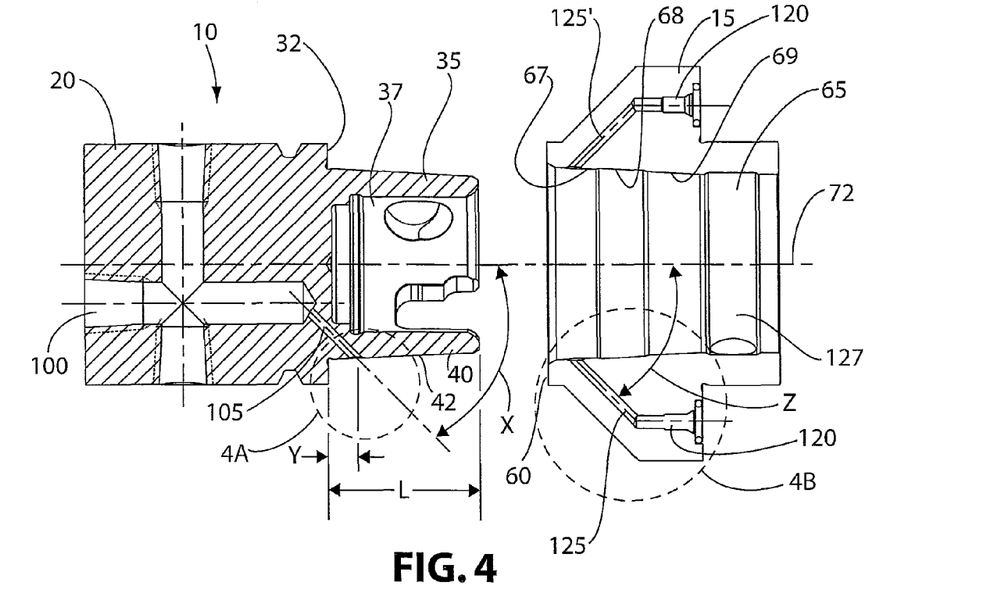
FIG. 4 is a cross-sectional view of a toolholder and toolholder support member in accordance with the subject invention in a disengaged position.
Figure 4A:
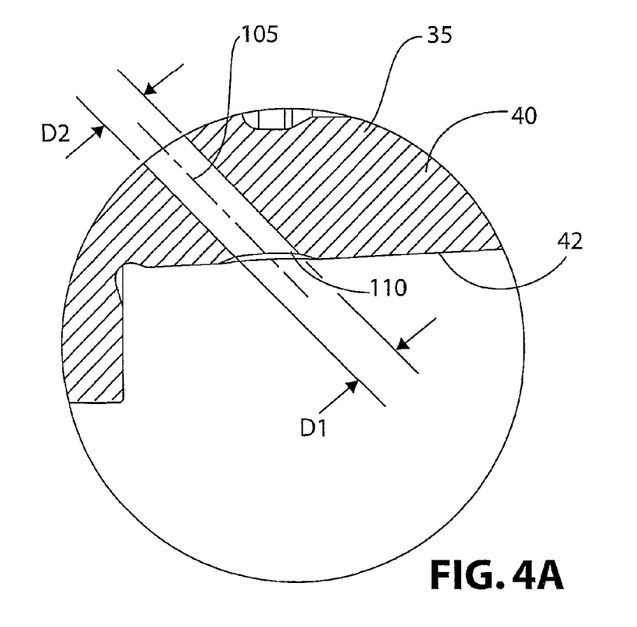
FIG. 4A is an enlarged view of the region encircled in FIG. 4 labeled "4A"

Directing attention to FIG. 4, the bore 65 is sized such that adjacent to the rearwardly facing surface 60 is a first resilient interference fit segment 67 and spaced longitudinally therefrom is a separate second resilient interference fit segment 69. That feature of FIG. 4 is prior art. Returning to FIG. 2, the first resilient interference fit segment 67 occurs in a region where the toolholder shank 35 is comprised of a continuous band of material about the circumference of the shank 35, while the separate second resilient interference fit segment 69 occurs in a region where the radially displaced balls 55 act upon the angled forwardly facing surfaces 50 of the shank 35 to force the shank wall 40 against the bore wall 66 of the toolholder support member 15.

Directing attention to FIGS. 1 and 2, in operation, the lock rod 70 reciprocates along a longitudinal axis 72. As illustrated in FIG. 1, the lock rod includes depressions 74 and ramps 76 in the uncoupled state. As illustrated in FIG. 1, the locking balls 55 are recessed within the depression 74 of the lock rod 70 and the shank 35 is free to move back and forth within the bore 65. When the lock rod 70 is moved to the right (FIG. 2), the locking balls 65 are radially displaced from the depressions 74 and move outwardly along the ramp 76 to engage the angled forwardly facing surfaces 50 of the perforations 45 of the shank 35. By doing so, the toolholder 10 is drawn into the toolholder support member 15 to provide a resilient interference fit between the shank 35 and the bore 65, while at the same time, the forwardly facing shoulder 32 abuts with the rearwardly facing surface of the toolholder support member 15. The shank 35 may include a slot to radially orient the toolholder shank 35 within the toolholder support member 15.

Additional details of the toolholder 10 and the toolholder support member 15 and their relationship may be found in U.S. Pat. No. 4,723,877 and U.S. Pat. No. 4,747,735, each of which are assigned to Kennametal Inc., the assignee of the present application, and each of which is hereby incorporated by reference.

The toolholder 10 and toolholder support member 15 are made of high strength alloy steel.

Typically, during a metal working operation, a liquid coolant is introduced at the interface between the cutting tool, for example, cutting insert 25, and the workpiece to not only cool the interface but additionally to assist in removing material from this interface. In the past, for the arrangement illustrated in FIGS. 1 and 2, coolant was introduced through a passageway extending through the lock rod 70 and into the shank cavity 37 at which point a coolant passageway extended through the front end 20 of the toolholder 10 and was directed as desired. As cutting applications and materials became more sophisticated, there was a need to increase the pressure of the coolant and there now exists a need to provide coolant at very high pressures. In the prior art embodiments, the coolant was sealed within the toolholder 10 and the toolholder support member 15 through the use of rubber seals strategically located. However, such seals are less effective with high pressure coolant and, therefore, another design was required to accommodate high pressure coolant.

SUMMARY OF THE INVENTION

In one embodiment, a toolholder for mounting within a toolholder support member has a body with a front end for holding a cutting tool and a back end for supporting the body within the toolholder support member. The back end has a forwardly facing shoulder and a tubular shank extending therefrom. The shank is hollow defining a shank cavity and has a shank wall with radially extending perforations having angled forwardly facing surfaces adapted to be engaged by radially displaced balls. At least one internal passageway extends through the cutting tool and at least one receiving passageway extends from the internal passageway through the shank wall to the exterior of the shank defining a shank orifice, wherein the passageway does not intersect with the shank cavity.

In another embodiment, a coolant coupling system is comprised of a toolholder having a front end for holding a cutting tool and a back end for supporting the body within a toolholder support member. The back end has a rearwardly facing shoulder and a frusto-conical shank extending therefrom. The shank is hollow defining a shank cavity and has a shank wall with radially extending perforations having angled forwardly facing surfaces adapted to be engaged by radially displaced balls. At least one internal passageway extends through the cutting tool and at least one receiving passageway extends from the internal passageway through the shank wall to the exterior of the shank defining a shank orifice. The passageway does not intersect with the shank cavity. Additionally, a toolholder support member has a body with a rearwardly facing surface and a bore extending forwardly therefrom. The bore is sized such that adjacent to the rearwardly facing surface is a first resilient interference fit segment with the shank and spaced longitudinally therefrom is a separate second resilient interference fit segment formed by the radially displaced balls acting upon the angled forwardly facing surfaces of the shank. At least one internal passageway extends through the toolholder support member body and at least one discharge passageway extends from the internal passageway to the interior of the bore defining a bore orifice. The bore orifice is aligned with the shank orifice to provide a coolant coupling between the toolholder and the toolholder support member in a first interference fit segment adjacent to the rearwardly facing surface of the toolholder support member body.

DETAILED DESCRIPTION OF THE INVENTION

The inventive feature is directed to the manner by which coolant is routed through the toolholder 10 and the toolholder support member 15. For that reason, identical reference numerals to those used in FIGS. 1-3 will be used for prior art components.

Directing attention to FIG. 4, it should be noted that the toolholder 10 does not include the details of the front end 20 illustrated in FIG. 1, but is illustrated as a blank machined with passageways to direct coolant flow. In particular, the front end 20 has at least one internal passageway 100 extending through the body 20 and, with respect to FIG. 1, may be directed to the cutting tool 25. Additionally, at least one receiving passageway 105 extends from the internal passageway 100 through the shank wall 40 to the exterior of the shank, thereby defining a shank orifice 110. The receiving passageway 105 does not intersect with the shank cavity 37.

The shank orifice 110 is positioned axially along the shank 35 at a position from the forwardly facing shoulder 32 of Y, which is no more than $\frac{1}{3}^{rd}$ of the taper length L of the shank 35. Additionally, the receiving passageway 105 forms an angle X with the longitudinal axis 72 of the toolholder support member 15. The angle X may be between 15 and 75 degrees, however, is preferably 45 degrees.

The shank orifice 110 has a diameter D2 greater than the diameter D1 of the receiving passageway 105 to provide an oversized cavity 115. The oversized cavity 115 may have a spherical curvature. In general, the cross-sectional area of the cavity 115 should be greater than the cross-sectional area of the receiving passageway 115.

Figure 4B:
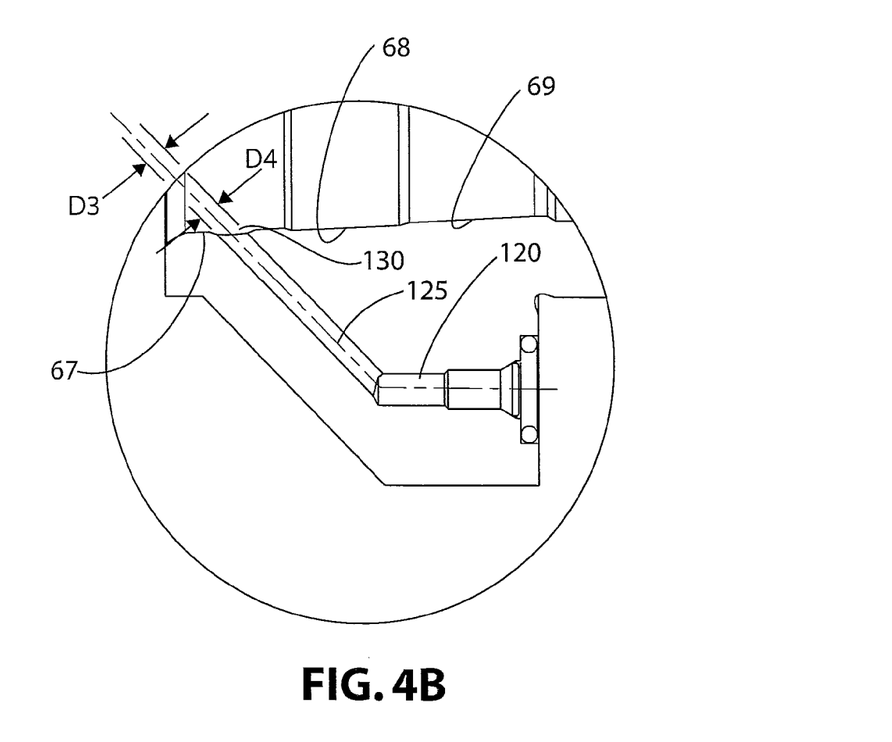
FIG. 4B is an enlarged view of the encircled area identified as "4B" in FIG. 4.
Figure 5:
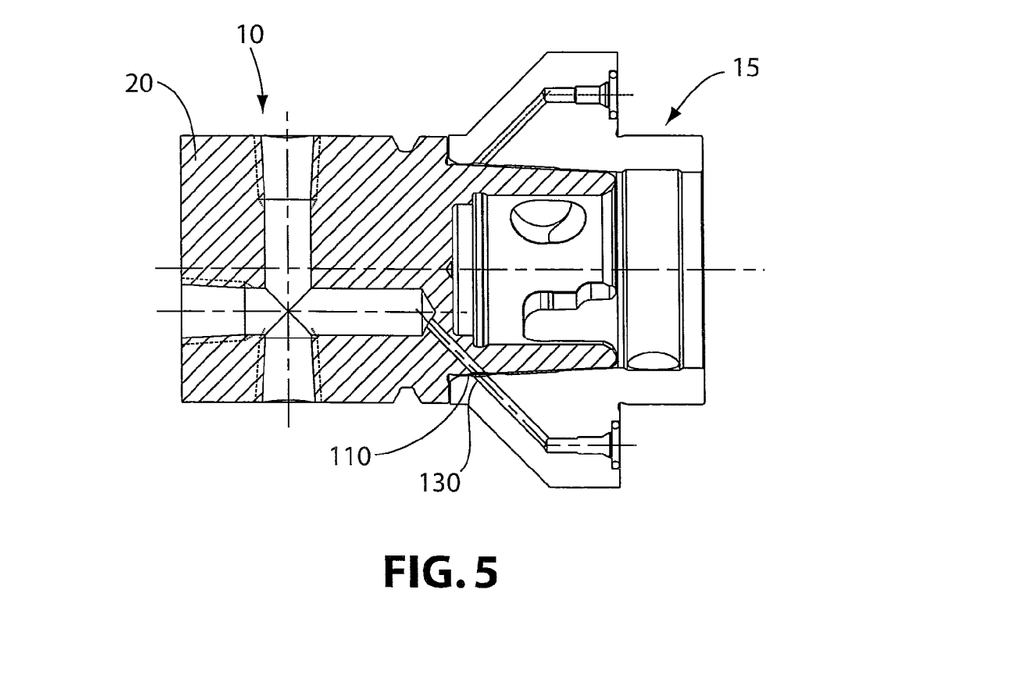
FIG. 5 is a sectional view of the arrangement in FIG. 4 in the engaged position.

The coolant coupling system is comprised of the toolholder 10 with the internal passageway 100 and the receiving passageway 105 along with the toolholder support member 15. Directing attention to FIGS. 4 and 4B, the toolholder support member 15 includes at least one internal passageway 120 extending through the toolholder support member body and includes at least one discharge passageway 125 extending from the internal passageway 120 to the interior 127 of the bore 65 defining a bore orifice 130. As illustrated in FIG. 5, the bore orifice 130 is aligned with the shank orifice 110 to provide a coolant coupling between the toolholder 10 and the toolholder support member 15 in a first resilient interference fit segment 67 adjacent to the rearwardly facing surface 60 of the toolholder support member body 62. The bore 65 further includes a relief region 68 between the first resilient interference fit segment 67 and the second resilient interference fit segment 69. Just as with the receiving passageway 105, the bore orifice 130 of the toolholder support member 15 has a diameter D3 greater than the diameter of the discharge passageway 125 to provide an oversized cavity 135. In general, the cross-sectional area of the cavity 135 should be greater than the cross-sectional area of the discharge passageway 125. It should be noted, however, that it may not be necessary for the toolholder cavity 115 and the toolholder support member cavity 135 to each be larger than their respective passageways. One oversized cavity 115, 135 may be sufficient to provide a fluid connection between the toolholder 10 and the toolholder support member 15.

Figure 6:
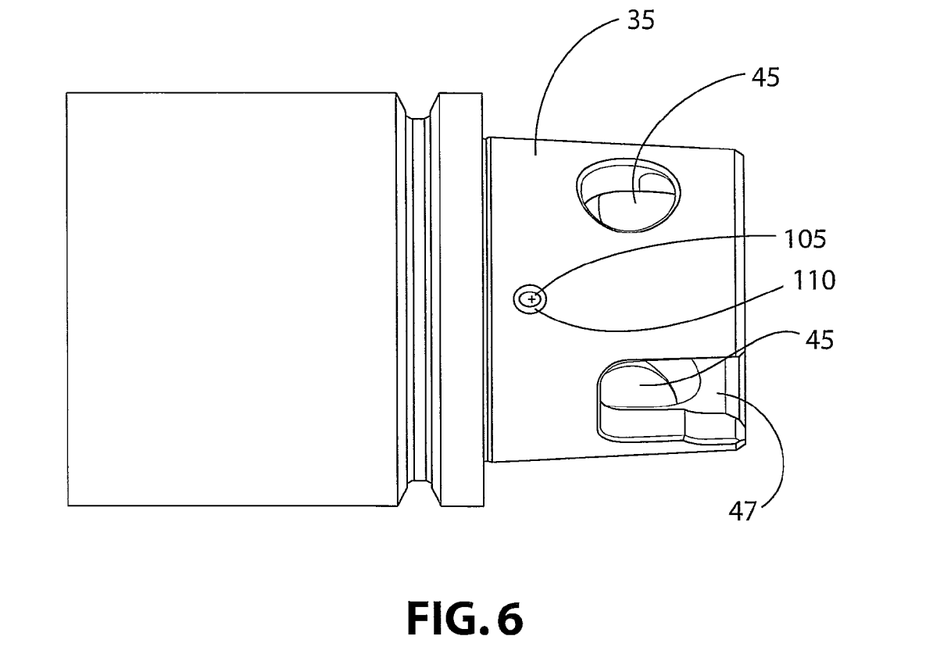
FIG. 6 is a perspective view of the back end of a toolholder in accordance with the subject invention.
Figure 6A:
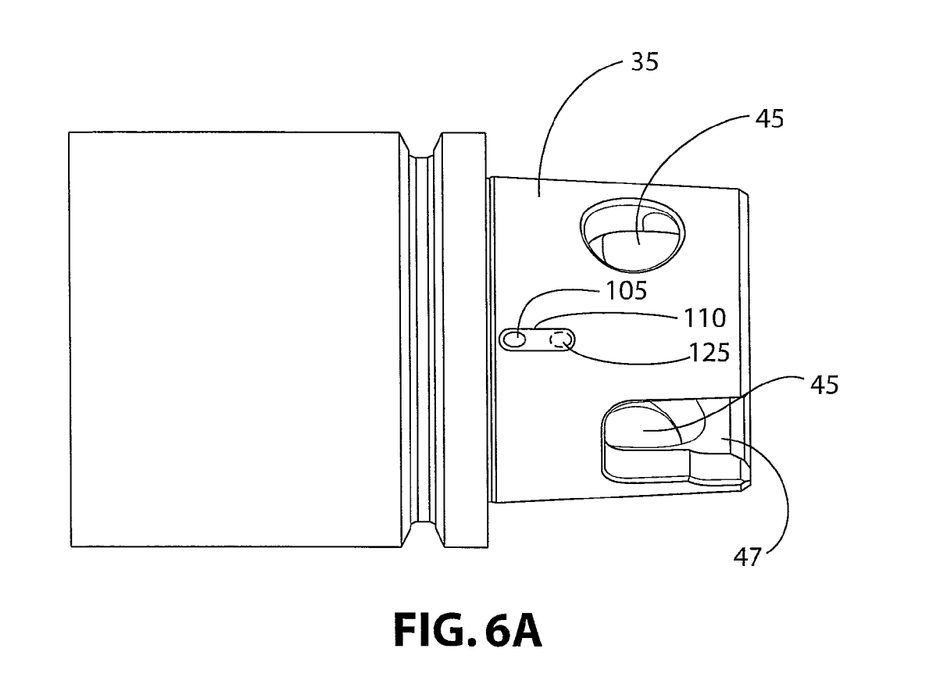
FIG. 6A is a variation of the perspective view of FIG. 6, wherein the orifice is modified to accommodate a toolholder support member passageway not directly aligned with the toolholder passageway.

FIG. 6 illustrates the oversized cavity 115. It is also possible, as illustrated in FIG. 6A, to expand the cavity 115, or the cavity 135 of the toolholder support member 15, so that a channel 116 is formed upon the surface of the shank 35 to accommodate any additional misalignment. This may be especially helpful when the receiving passageway 105 is not co-axial with the discharge passageway 125 or when the passageways 105, 125 do not directly intersect with one another.

FIG. 6A is a variation of FIG. 6, wherein shank orifice 110 is modified to accommodate a toolholder support member passageway 125 not directly aligned with the toolholder passageway 105. In this arrangement the orifice 110 may generally function as a channel.

To form the first resilient interference fit segment 67, the gauge diameter, that is the maximum diameter, of the shank 35 in the region of the interference should be 0.5-1.2 percent larger than the bore diameter at that location. The interference fit is more fully described in ISO 26622.

As previously mentioned with respect to FIG. 4, the shank orifice 110 of the toolholder 10 is positioned axially along the shank 35 at a position Y from the forwardly facing shoulder 32 of no more than $\frac{1}{3}^{rd}$ of the taper length L of the shank 35. As seen, with respect to FIGS. 4 and 5, when the toolholder 10 is fully inserted within the toolholder support member 15, not only is the shank orifice 110 aligned with the bore orifice 130, but furthermore, this alignment occurs within the first resilient interference fit segment 67. The resilient interference fit at this location, by design, produces greater interference contact pressures between the shank 35 and the bore 65 and, as a result, the seal between the shank orifice 110 and the bore orifice 130 is the greatest. This arrangement provides a design that eliminates the need for rubber seals and provides the capacity for transferring coolant between the toolholder support member 15 and the toolholder 10 having pressures in excess of 5000 psi.

The discharge passageway 125 of the toolholder support member 15 may form an angle Z with the longitudinal axis 72 of between 15 and 75 degrees and preferably 45 degrees. As illustrated in FIGS. 4 and 5, the receiving passageway 105 and a discharge passageway 125 may be co-axial with one another. As furthermore illustrated in FIGS. 4 and 5, the toolholder support member 15 includes two discharge passageways 125, 125' diametrically opposed to one another, wherein the receiving passageway 105 of the toolholder 10 may be introduced within the toolholder support member 15 at 180 degree intervals, while still providing coolant flow between the toolholder 10 and the toolholder support member 15 because now, for example, receiving passageway 105 will be aligned with discharge passageway 125'.

Figure 7:
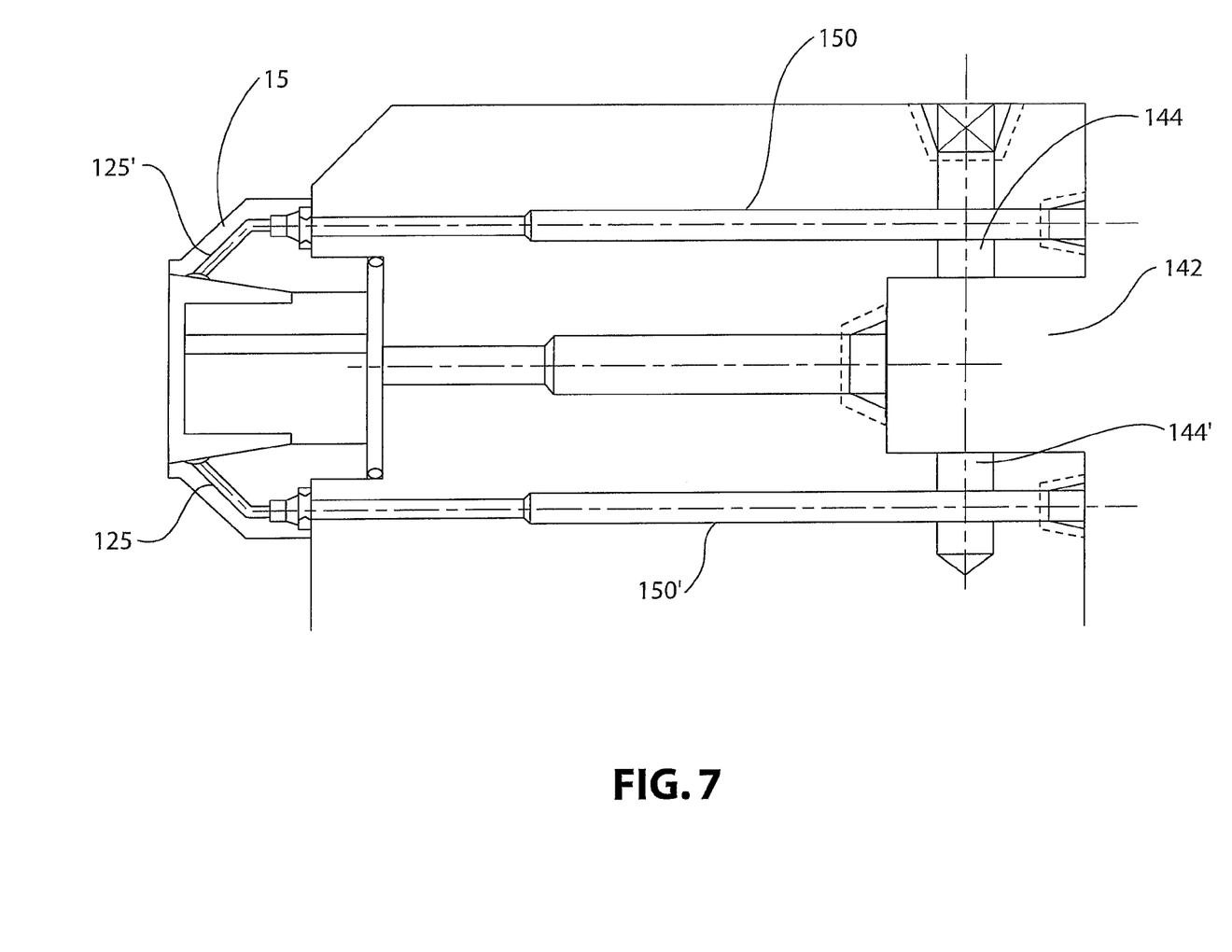
FIG. 7 is schematic of a toolholder support member illustrating the flow of coolant therethrough.

FIG. 7 illustrates a schematic of the toolholder support member 15 and the coolant supply lines through the block 140 upon which the toolholder support member 15 is mounted. Coolant travels into a manifold 142 having manifold channels 144, 144' extending radially outward to intersect with transfer channels 150, 150'. The transfer channels supply coolant to the discharge passageways 125, 125' of the toolholder support member 15. It should be appreciated that each of the discharge passageways 125, 125' may be energized and in the event the shank 35 includes only one receiving passageway 105 aligned with, for example, discharge passageway 125, then the remaining discharge passageway 125' will be blocked by the shank 35 of the toolholder 10.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A toolholder for mounting within a toolholder support member having a longitudinal axis wherein the toolholder comprises a body having:
   a) a front end for holding a cutting tool;
   b) a back end for supporting the body within the toolholder support member; wherein the back end has a forwardly facing shoulder and a frusto-conical shank extending therefrom, wherein the shank is hollow defining a shank cavity and wherein the shank has a shank wall with radially extending perforations having angled forwardly facing surfaces adapted to be engaged by radially displaced balls; and
   c) at least one internal passageway extending through the front end of the body and at least one receiving passageway extending from the internal passageway through the shank wall of the frusto-conical shank to the exterior of the shank defining a shank orifice; wherein the passageway does not intersect with the shank cavity.

2. The toolholder according to claim 1, wherein the shank further includes at least one locating slot to radially orient the toolholder shank within the toolholder support member.

3. The toolholder according to claim 1, wherein the shank orifice is positioned axially along the shank at a position from the shoulder no further than $\frac{1}{3}^{rd}$ of the length of the shank.

4. The toolholder according to claim 1, wherein the receiving passageway is angled relative to the longitudinal axis.

5. The toolholder according to claim 4, wherein the receiving passageway forms an angle X with the longitudinal axis of approximately 45 degrees.

6. The toolholder according to claim 5, wherein the shank orifice has a diameter greater than that of the receiving passage to provide an oversized cavity.

7. The toolholder according to claim 6, wherein the oversized cavity has a spherical curvature.

8. A coolant coupling system comprised of:
   a) a toolholder for mounting within a toolholder support member having a longitudinal axis wherein the toolholder comprises a body having:
      1) a front end for holding a cutting tool;
      2) a back end for supporting the body within a toolholder support member; wherein the back end has a rearwardly facing shoulder and a frusto-conical shank extending therefrom, wherein the shank is hollow defining a shank cavity and wherein the shank has a shank wall with radially extending perforations having angled forwardly facing surfaces adapted to be engaged by radially displaced balls; and
      3) at least one internal passageway extending through the front end of the body and at least one receiving passageway extending from the internal passageway through the shank wall of the frusto-conical shank to the exterior of the shank defining a shank orifice; wherein the passageway does not intersect with the shank cavity;
   b) a toolholder support member having;
      1) a body with a rearwardly facing surface and a bore extending forwardly therefrom, wherein the bore is sized such that adjacent to the rearwardly facing surface is a first resilient interference fit segment with the shank and spaced longitudinally therefrom is a separate second resilient interference fit segment formed by the radially displaced balls acting upon the angled forwardly facing surfaces of the shank;
      2) at least one internal passageway extending through the toolholder support member body and at least one discharge passageway extending from the internal passageway to the interior of the bore defining a bore orifice; wherein the bore orifice is aligned with the shank orifice to provide a coolant coupling between the toolholder and the toolholder support member in a first interference fit segment adjacent to the rearwardly facing surface of the toolholder support member body.

9. The coolant coupling system according to claim 8, further including a relief region between the first resilient interference fit segment and the second resilient interference fit segment.

10. The coolant coupling system according to claim 9, wherein the receiving orifice of the toolholder has a diameter greater than that of the shank passageway to provide an oversized cavity.

11. The coolant coupling system according to claim 9, wherein the bore orifice of the toolholder support member has a diameter greater than that of the discharge passageway to provide an oversized cavity.

12. The coolant coupling system according to claim 9, wherein the gauge diameter of the shank is between 0.5-1.2 percent larger than the bore diameter in the region of the first resilient interference fit.

13. The coolant coupling system according to claim 8, wherein the shank orifice of the toolholder is positioned axially along the shank at a position from the shoulder no further than $\frac{1}{3}^{rd}$ of the length of the shank.

14. The coolant coupling system according to claim 13, wherein the discharge passageway forms an angle Z with the longitudinal axis of approximately 45 degrees.

15. The coolant coupling system according to claim 14, wherein the receiving passageway forms an angle X with the longitudinal axis of approximately 45 degrees such that the discharge passageway and the receiving passageway are co-axial with one another.

16. The coolant coupling system according to claim 14, wherein the receiving passageway and the discharge passageway do not intersect and are connected through modifications of the one or both of the shank orifice and the bore orifice.

17. The coolant coupling system according to claim 8, wherein there are two discharge passageways diametrically opposed to one another and at least one receiving passageway such that the toolholder may be introduced within the toolholder support member at 180 degree intervals.

* * * * *